Feb. 6, 1951  F. W. AVILA  2,540,232
OVERRUNNING CLUTCH TYPE GEAR SYNCHRONIZER
Filed April 29, 1948  4 Sheets-Sheet 1

INVENTOR.
Frank W. Avila
BY Paul O. Pippel
Atty.

Feb. 6, 1951        F. W. AVILA        2,540,232
OVERRUNNING CLUTCH TYPE GEAR SYNCHRONIZER
Filed April 29, 1948        4 Sheets-Sheet 2
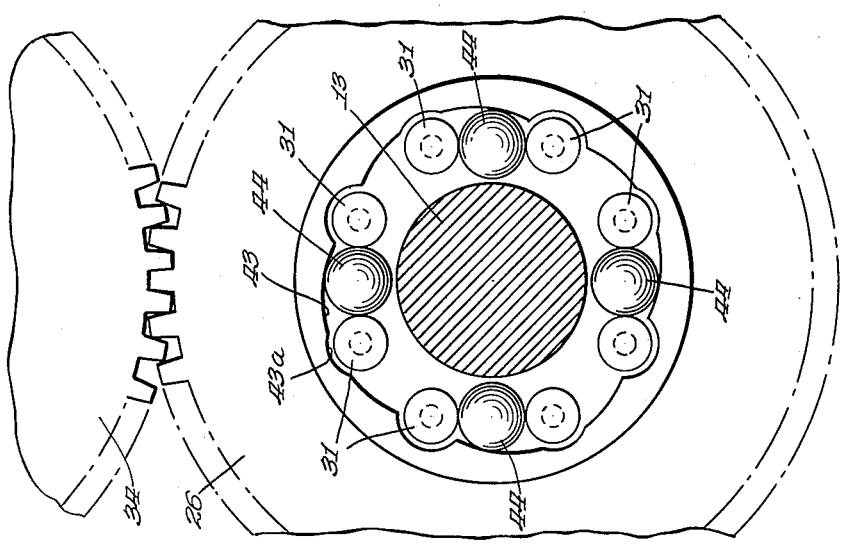
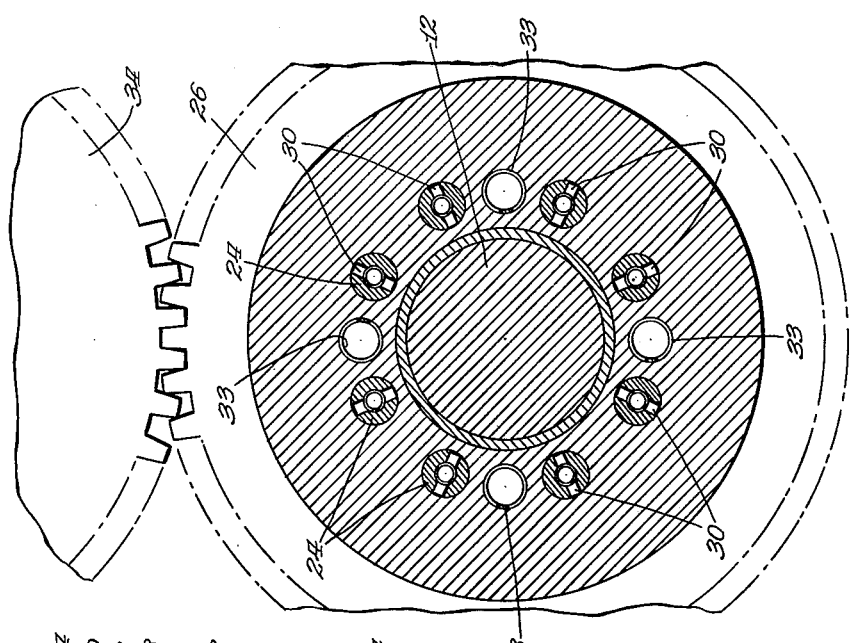
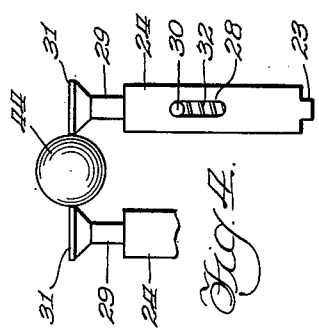
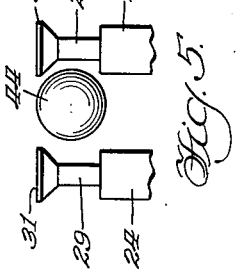
INVENTOR.
Frank W. Avila
Paul O. Pippel
Atty Feb. 6, 1951          F. W. AVILA          2,540,232
OVERRUNNING CLUTCH TYPE GEAR SYNCHRONIZER
Filed April 29, 1948          4 Sheets-Sheet 3
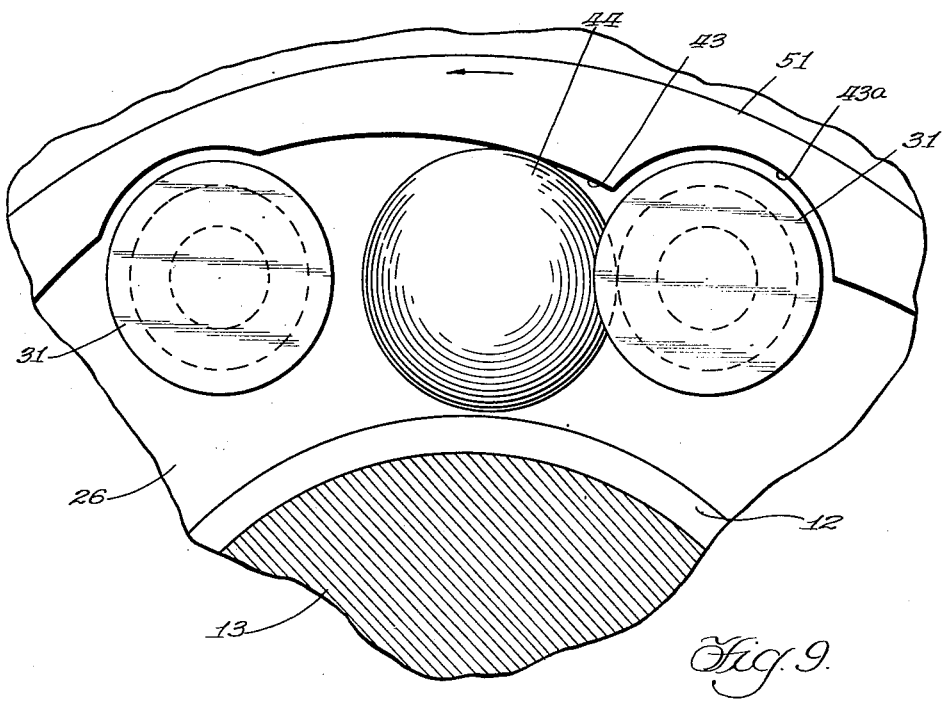
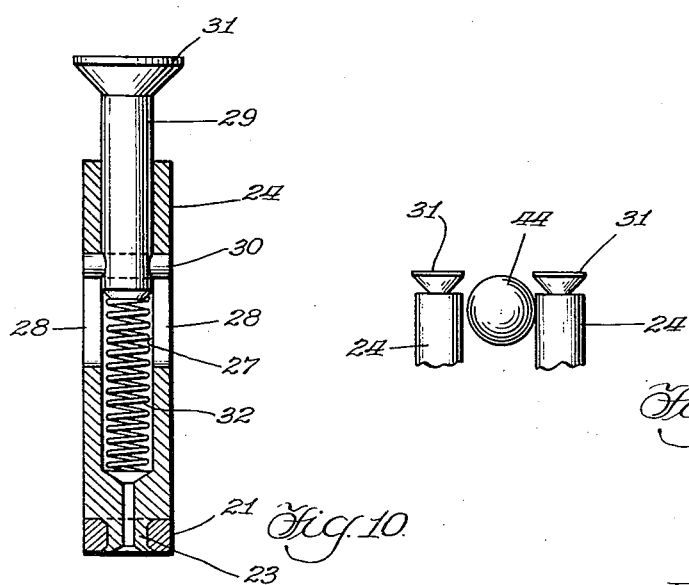
Inventor
Frank W. Avila
Atty.

Feb. 6, 1951 F. W. AVILA 2,540,232
OVERRUNNING CLUTCH TYPE GEAR SYNCHRONIZER
Filed April 29, 1948 4 Sheets-Sheet 4

Inventor
Frank W. Avila
Paul O. Pippel
Atty.

Patented Feb. 6, 1951

2,540,232

UNITED STATES PATENT OFFICE 2,540,232

OVERRUNNING CLUTCH TYPE GEAR SYNCHRONIZER

Frank W. Avila, Columbia City, Ind., assignor to International Harvester Company, a corporation of New Jersey Application April 29, 1948, Serial No. 23,888

7 Claims. (Cl. 192—53)

This invention relates to synchronizing mechanisms, but more particularly to an overrunning clutch type of synchronizer adaptable for use with a variable speed transmission.

In mechanisms of this character it is highly desirable that they be simple in construction, positive and reliable in operation, and suitable for incorporation into a conventional type variable speed transmission device without involving substantial structural alterations therein. Furthermore, particularly when applied to automotive vehicles, it is essential that they utilize a minimum of space requirements. These and other objectives have been accomplished in the present invention whose general purpose and object, therefore, is to provide an improved synchronizing mechanism of the overrunning clutch type that may be readily adapted for use with conventional variable speed transmission devices.

One of the principal objects of this invention is to provide a simple and highly effective synchronizing mechanism utilizing friction means for equalizing gear tooth velocities so they may be engaged or disengaged without clashing or damage to the gear teeth.

Another important object is to provide a synchronizing clutch employing a unique and novel principle of operation involving transmission of torque from a driving shaft to a driven shaft through spherical ball-like members tightly positioned in circumferentially disposed cam ramps.

A further important object is to provide a new and improved synchronizing clutch involving friction torque-transmitting means, which, after having operated to equalize mating gear tooth velocities and permitted said mating teeth to be meshed in positive drive relationship, may be rendered inoperative, to avoid wear thereon, during the period said gears are meshed in a positive driving relationship.

A still further object is to provide a synchronizing clutch that may be readily incorporated within a minimum of space into a conventional variable speed transmission device without substantial structural changes in said device.

Another object is to provide a synchronizing clutch wherein spring means are employed to aid the engaging and disengaging operations thereof and which, although of the friction type, is simple and easy to operate and may be operated with a minimum of pressure by the operator.

A yet further object is to provide a novel and improved synchronizing clutch wherein the friction torque-transmitting means is engaged or disengaged by spring actuating means of light construction so that a minimum of pressure need be applied by the operator to the control members thereof to either engage or disengage said mechanism.

Further advantages and objects of the present invention will be apparent from the full description, reference being had to the accompanying drawings, wherein a preferred form of the invention is clearly shown.

Fig. 2 is a section taken on line 2—2 of Fig. 1.

Fig. 3 is a modified section taken on line 3—3 of Fig. 1.

Fig. 4 is a fragmentary view showing the relationship and position of the spherical ball-like members with respect to the plunger heads when in neutral position.

Fig. 5 is a fragmentary view showing the relationship and position of the spherical ball-like members with respect to the plunger heads when in operating or torque-transmitting position.

Fig. 6 is a fragmentary view showing the relationship and position of the spherical ball-like members with respect to the plunger heads and sliding pin members when the mechanism is in positive drive but the synchronizing members are disengaged.

Fig. 9 is an enlarged fragmentary detail of a portion of Fig. 3 and shows the space relationships between the spherical ball-like members and plunger heads, and between the spherical ball-like members, cam ramp, and driven shaft member, when the mechanism is in positive drive but the synchronizing members are disengaged. The relative position of these members correspond with those shown in Fig. 6.

Fig. 10 is an enlarged sectional view of the slidable pin and plunger assembly of the present invention.

Figure 1:
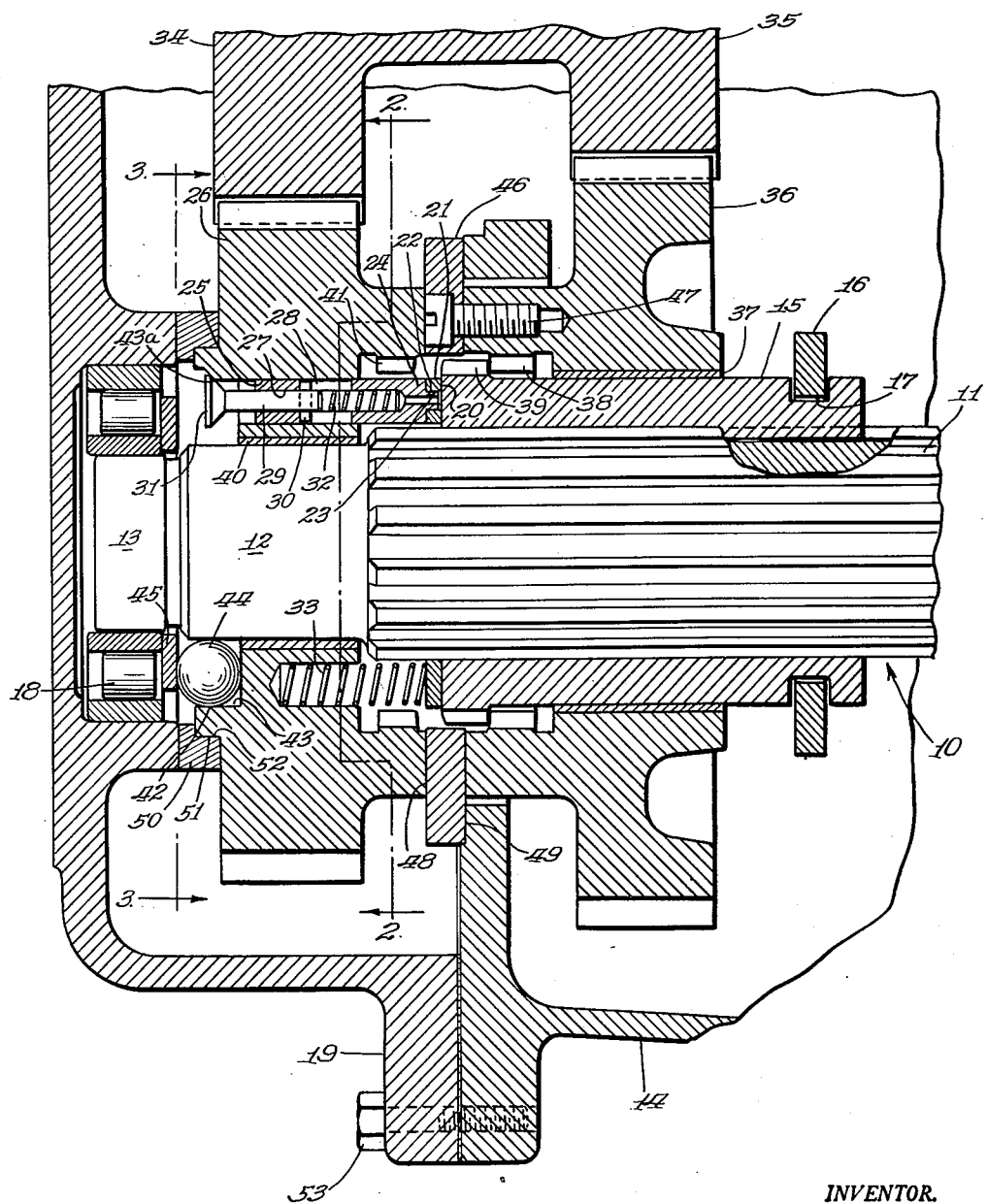
Fig. 1 is a sectional view taken through a portion of a variable speed transmission in which the present invention has been incorporated.

A counter-shaft 10, fashioned with a splined section 11 and two contiguous reduced and unsplined sections 12 and 13, is adapted for connection at one end thereof through a variable speed transmission mechanism (not shown) to a driven shaft (not shown), all of which is encased within a housing 14. The splined portion 11 of the shaft 10 is adapted for rotation within an axially extending slidable sleeve 15, the axial movement of which is controlled by a fork 16, positioned in an annular groove 17 at one end of said sleeve, said fork in turn being connected to an external control mechanism (not shown). The opposite, or reduced section end 13, of the shaft 10 is journaled in roller bearings 18 supported within a housing section 19.

The inner marginal edge 20 of the sliding sleeve 15 abuts an annular thrust ring 21, the opposite face of which is provided with a plurality of circumferentially spaced openings 22, each of which is adapted to receive in pressed fit relationship the reduced end section 23 of a hollow pin 24. Each such pin is additionally slidably mounted in circumferentially spaced openings 25, in the spur gear 26, and provided with a bored-out center section 27 and a transversely cut axially extending slot 28.

A plunger shaft 29, slidably positioned in each pin 24, is adapted for limited axial movement with respect to said pin by means of a cross-pin 30 fixedly positioned in said shaft 29 and extended therebeyond so as to slide along through both sides of slot 28. An enlarged head 31, of slightly larger diameter than the diameter of the pin 24, is fashioned integrally with one end of each of said plunger shafts 29. A compression type coil spring 32, overlying the chamfered end of the plunger shaft 29 and positioned within a portion of the bored out center section 27 of the pin 24 operates to aid in control of said plunger heads 31, as will be further explained hereinafter. The annular thrust ring 21 also abuts a plurality of compression type coil springs 33 positioned in recesses circumferentially spaced around the face of the gear 26 and alternately positioned therearound with respect to the pins 24 and plunger shafts 29. In other words, there is one such spring 33 disposed between each set of two pins 24 circumferentially spaced around the vertical face of the gear 26. For reasons which will hereinafter become apparent, the springs 33 are heavier and provide a greater reactive component than the pin springs 32.

Compound gears 34 and 35, affixed to a driving shaft (not shown) that, in turn, connects with a power input means such as a vehicle power plant (not shown), are independently journaled in bearings (not shown) and adapted for meshing with the spur gears 26 and 36. Gear 36 is rotatably supported on the slidable sleeve 15 but spaced therefrom by a sleeve bushing 37. Said gear 36 is also provided with an internally toothed spur gear 38, adapted for meshing engagement with a pinion gear 39, fashioned on one end of the sleeve 15, to provide a dental clutch assembly type of positive drive. Gear 26 is rotatably mounted on an unsplined portion 12 of the shaft 10 and spaced therefrom by a bushing sleeve 40. This gear is likewise provided with an internally toothed spur gear 41 also adapted for positive meshing engagement with said pinion gear 39 in the dental clutch assembly. A recessed shoulder portion 42, in the vertical face of the gear 26, has its axially extending surface fashioned into a plurality of cam ramps 43 chamfered recesses 43a, adapted to provide tracks for a plurality of steel balls 44. One such ball is positioned between each set of two plunger heads 31. An annular ring 45, on the reduced portion 13 of the shaft 10, is positioned so as to provide a retainer for the balls 44 and thus prevent them from rolling out of their respective cam ramps and into contact with the roller bearings 18.

An annular ring 46, affixed to the inner vertical face of the gear 36 preferably by means of stud screws 47, is positioned so as to provide thrust bearing surfaces 48 and 49, respectively, between the spur gears 26 and 36, and between the gear 36 and the housing section 14, and additionally, to prevent axial movement of said gears 26 and 36. An additional annular ring 50, of bearing material and having a recess 51 in one side thereof, is seated over a shoulder 52 on the outer vertical face of the gear 26 and, as thus positioned, provides a bearing surface between said gear and the housing section 19. Said housing section 19 may, in turn, be secured by suitable means, such as a plurality of stud bolts 53, to the opposed housing section 14.

*Operation*

Figure 7:
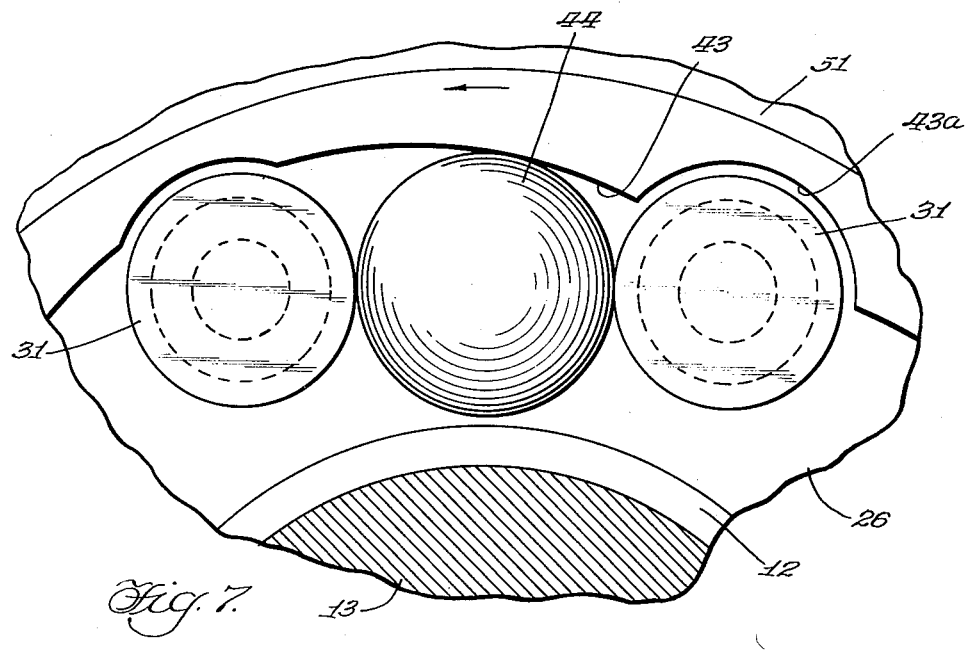
Fig. 7 is an enlarged fragmentary detail of a portion of Fig. 3 and shows the space relationships between the spherical ball-like members and plunger heads, and between the spherical ball-like members, cam ramp, and driven shaft member, when the synchronizer is in neutral position. The relative position of these members correspond with those shown in Fig. 4.

In operation, the synchronizer functions to cause both the driving and driven shafts to rotate at substantially the same speeds so that gears connected therebetween may be engaged in positive relationship without clashing or damage to the gear teeth. As shown in Fig. 1, the synchronizer is illustrated in a neutral position with the pinion gear 39 of the dental clutch in a position axially between, and out of engagement with, the two internally toothed gears 38 and 41. In such position the slidable sleeve 15 closely abuts the annular ring 21 while the hollow pins 24, affixed thereto, and the plunger heads 31 are maintained in mid-position with respect to the balls 44. Since each plunger head is simultaneously operated, as a result of axial movement of the ring 21, it will be appreciated that plunger heads adjacent opposite sides of said balls will ordinarily maintain the same relative positions with respect to each other and to the ball centered therebetween. With the slidable sleeve 15 in mid or neutral position the plunger heads, therefore, will be positioned opposite the center of the balls, and in rolling contact therewith, while the balls are held in close fitting contact with the cam ramp 43 on one side and spaced from the shaft 12 on the opposite side, as best illustrated in Fig. 4 and in enlarged detail in Fig. 7. As thus positioned any clockwise rotation of the compound gear 34 (as viewed in Fig. 3) will in turn rotate spur gear 26 counterclockwise (see Figs. 3, 7, 8 and 9), and since the balls 44 are located midway between the plunger heads and in contact with the cam ramp, said balls will likewise be carried counterclockwise with the gear 26 instead of rotating individually; thus, with the mechanism still in neutral position, any rotation of the gears 26 and 34, and the balls 44 carried therein, will only result in the gear 26 overriding the shaft 12 and will not transmit any motion thereto regardless of whether such shaft is rotating, or is stationary, at the time.

Figure 8:
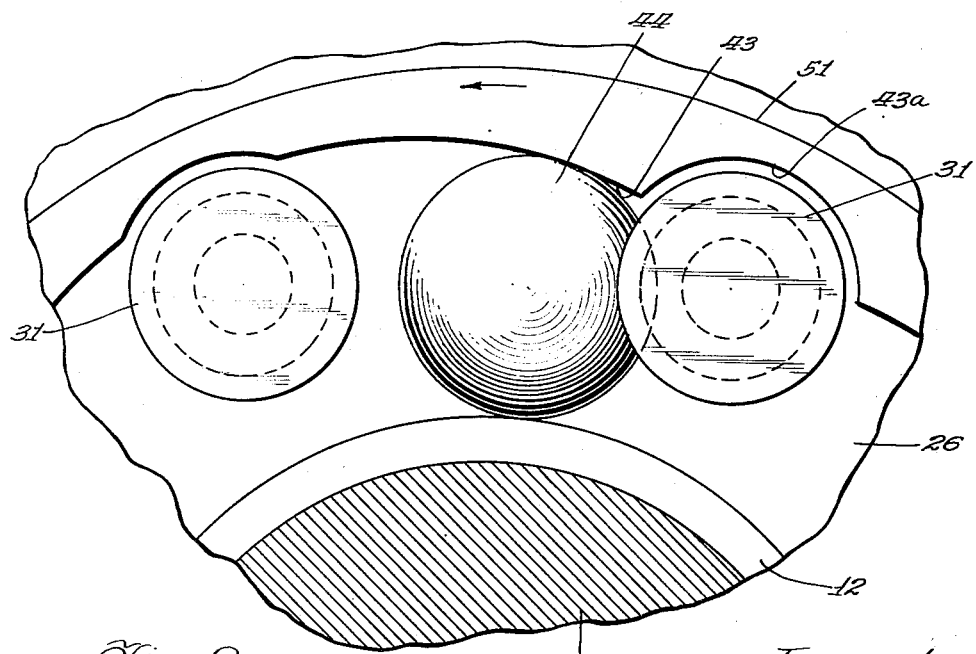
Fig. 8 is an enlarged fragmentary detail of a portion of Fig. 3 and shows the space relationships between the spherical ball-like members and plunger heads, and between the spherical ball-like members, cam ramp, and driven shaft member, when the synchronizing mechanism is in operative position. The relative position of these members correspond with those shown in Fig. 5.

Now, assuming it is desired to transmit torque from the compound gear 34 to the shaft 10, while said gear is rotating and the shaft is stationary. In such event, operation of the forked lever 16 functions to move the slidable sleeve 15 to the left (as viewed in Fig. 1), axially along the splined portion 11 of the shaft 10, and to force the annular ring 21 to slide the pins 24 axially through the openings 25 in the gear 26 and, as a result of such lateral movement, to compress the springs 32. Since the plunger heads 31 are still in tight contact with the balls 44 they will tend to remain in such position, and the plunger shafts 29, instead of following the movement of the pins 24, will thereupon force contraction of the springs 32 as the cross pins 30 ride the slots 28. Then, when the reactive force of the springs 32 is sufficient to overcome the frictional force holding the plunger heads against the balls 44, said springs 32 will extend with a snapping action and force the plunger heads 31 clear of contact with the balls 44; thus leaving said balls free to ride the cam ramps 43. Said balls will immediately ride down the ramps to a position where they will come into tight binding or frictional contact with the shaft 12 on one side and the cam ramp 43 on the opposite side and thereby pick up the shaft 10 and start it rotating in a clockwise direction (as best illustrated in Figs. 5 and 8). By the time shaft 10 is brought up to the same speed as the gear 26 the slidable sleeve 15 will have moved a distance sufficient to permit the pinion gear 39 of the dental clutch, to engage the internal gear 41 without clashing; thereby establishing a positive drive, between the gear 26 and the shaft 10, such as would be encountered under conventional driving conditions. Further axial movement of said sleeve 15 will force one of each set of pins 24 into contact with its associated ball 44, thus forcing the balls back up the cam ramp 43 a distance sufficient to provide clearance between said balls and the shaft 12 (as illustrated in Figs. 6 and 9). Centrifugal force thereafter will aid in maintaining the balls against the cam ramp and out of contact with the shaft. In this manner the synchronizing mechanism is automatically disengaged after positive driving engagement has been established.

In order to disengage the splined portion 11 of the shaft 10 from the gear 26 the forked control lever 16 is operated to slide the sleeve 15 axially to the right (as viewed in Fig. 1) along said shaft, whereupon the springs 33, which have been compressed by the previous engaging action, operate to force the annular ring 21 to follow said sleeve 15, in its axial movement along the splined portion of the shaft, and to carry with it the pins 24. This movement of the pins momentarily disengages the balls and allows them to again ride down the cam ramp thus transmitting limited torque between the gear 26 and the unsplined portion 12 and the shaft 10. Further axial movement of the pins 24 brings the plunger heads 31 again into contact with the balls 44 thus forcing said balls down the cam ramp 43 and out of tight frictional contact between said ramp and the shaft 12, and into a neutral position whereby they are free to ride between said plunger heads. Displacing the balls, from their tight fitting relationship between the cam and shaft, and then pulling the plunger heads back into neutral position opposite the center of the balls ordinarily requires a substantial force which is supplied by the springs 33 acting against the ring 21. When the sleeve 15 has moved sufficiently to disengage pinion 39 from the internal gear 41 the pins 24 and plunger shafts 29 will likewise have moved sufficiently to permit their return to a neutral position, and in such position, the connection between gear 26 and the shaft 10 having been discontinued, said shaft is free to cease rotation or, if desired, to rotate at a greater speed than that of the gear 26. After the sleeve 15 returns to its mid or neutral position, the annular ring 21 and its associated plunger head mechanisms are prevented from overtravelling their neutral position and causing disengagement of the plunger heads from contact with the balls, by the springs 32 and 33 which have been extended simultaneously therewith to their non-reactive or neutral positions, and because the head 31 rests against the chamfered surface 43a as a positive stop.

If, when it becomes desirable to engage the gear 26 and shaft 10 in positive drive, the shaft 10 is rotating at a speed such that the gear tooth velocity of the pinion 39 is greater than that of the gear 41 then the operation of the synchronizing mechanism would be as follows. As heretofore explained, when the sleeve 15 is moved axially along the splined portion 11 of the shaft 10 the plunger heads 31 are forced away from their neutral positions opposite the center of the balls 44 and the balls become free to ride the cam ramp 43. As soon as these balls become free they tend to climb the ramp and seek out the narrowest portion thereby establishing a tight binding or frictional contact between their contacting surfaces and those of the cam ramp and shaft, respectively. However, since the unsplined portion 12 of the shaft 10 is traveling at a greater relative speed than that of the gear 26, there will be initial slippage between the contacting surfaces of the balls and those of the cam ramp and shaft, but, because of very high frictional contact therebetween any such slippage will be readily overcome, and, either the speed of the shaft 10 will be retarded, or that of the gear 26 correspondingly accelerated, depending on the torque relationship therebetween, so that, in any event the gear toothed velocities will be substantially equalized to permit meshing of the pinion 39 with the internal gear 41, of the dental clutch assembly, without clashing or damage.

In the event a positive connection between the gear 35 and the shaft 10 is desired, without the use of a synchronizer, such may be accomplished by actuating the forked control lever 13 in such manner as to cause the sliding sleeve 15, attached thereto, to move axially to the right (as viewed in Fig. 1), whereupon pinion 39 will be brought into meshing engagement with the internally toothed gear 38, of the dental clutch assembly, and the splined section 11 of the shaft 10 will be connected through gear 36 to the gear 35 to complete the positive drive.

In the preferred embodiment of the invention, illustrated herein, the synchronizing mechanism has been shown applied to only one gear ratio in a variable speed transmission, but it will be readily apparent to those skilled in the art that it might be adapted for use with several different gear ratios in the same transmission, or other modifications than the embodiment shown might be made without departing from the spirit of the invention or from the scope of the appended claims.

What is claimed is:

1. A synchronizer mechanism, comprising: a shaft; a driven member rotatably mounted on said shaft; an annular extension on said driven member having internally formed teeth therein; splines formed on said shaft; a sleeve-like member having internally formed splines and adapted for axial movement on said shaft and having externally formed teeth engageable with the internal teeth on said extension; a shifter member mounted on said sleeve-like member and adapted for axial movement therewith; said driven member being provided with a plurality of recesses in one face thereof and having said recesses fashioned to provide a plurality of bearing surfaces radially spaced from said shaft and circumferentially disposed therearound; spherical torque transmitting members adapted for positioning in the recesses in said driven member and further adapted for being positioned into a binding relation between the driven member on one side and said shaft on the opposite side thereof; and means including circumferentially spaced members slidably positioned in said driven member, and adapted for engaging and disengaging said torque transmitting members into and out of binding relation between said driven member and said shaft.

2. The structure defined in claim 1 further characterized by having said engaging and disengaging means disposed adjacent said spherical torque transmitting members.

3. A synchronizer mechanism, comprising: a shaft; a driven member rotatably mounted on said shaft; an annular extension on said driven member having internally formed teeth therein; splines formed on said shaft; a sleeve-like member having internally formed splines and adapted for axial movement on said shaft and having externally formed teeth engageable with the internal teeth on said extension; a shifter member mounted on said sleeve-like member and adapted for axial movement therewith; said driven member being provided with a plurality of recesses in one face thereof and having said recesses fashioned to provide a plurality of bearing surfaces radially spaced from said shaft and circumferentially disposed therearound; spherical torque transmitting members adapted for positioning in the recesses in said driven member and further adapted for being positioned into a binding relation between the driven member on one side and said shaft on the opposite side thereof, and means for engaging and disengaging said torque transmitting members into and out of binding relation between said driven member and said shaft; said means including a plurality of members slidably positioned within longitudinally apertured members in turn adapted for slidable movement in circumferentially spaced and axially disposed apertures in said driven member, an annular ring having circumferentially disposed recesses therein adapted to receive in pressed fit relation one end of each of said longitudinally apertured members, and a plurality of springs positioned in circumferentially disposed recesses in said driven member and positioned so as to abut one face of said annular ring.

4. A synchronizer mechanism, comprising: a shaft; a driven member rotatably mounted on said shaft; an annular extension on said driven member having internally formed teeth therein; splines formed on said shaft; a sleeve-like member having internally formed splines and adapted for axial movement on said shaft and having externally formed teeth engageably with the internal teeth on said extension; a shifter member mounted on said sleeve-like member and adapted for axial movement therewith; said driven member being provided with a plurality of recesses in one face thereof and having said recesses fashioned to provide a plurality of bearing surfaces radially spaced from said shaft and circumferentially disposed therearound; spherical torque transmitting members adapted for positioning in the recesses in said driven member and further adapted for being positioned into a binding relation between the driven member on one side and said shaft on the opposite side thereof; and means for engaging and disengaging said torque transmitting members into and out of binding relation between said driven member and said shaft; said means including a plurality of T-shaped members and resilient elements slidably positioned in abutting relation for axial movement in longitudinally extending recesses provided within a plurality of tubular members in turn adapted for slidable movement in circumferentially spaced and axially disposed apertures in said driven member, additional means for limiting the axial movement of said T-shaped members with respect to said tubular members, an annular ring having circumferentially disposed recesses therein adapted to receive in pressed fit relation one end of each of said tubular members, and a plurality of resilient elements positioned in circumferentially disposed recesses alternately arranged with respect to said tubular members in said driven member and adapted to abut one face of said annular ring.

5. A synchronizer mechanism, comprising: a shaft; a driven member rotatably mounted on said shaft and having a plurality of cam ramps fashioned therein; an annular extension on said driven member having internally formed teeth therein; splines formed on said shaft; a sleeve-like member having internally formed splines and adapted for axial movement on said shaft and having externally formed teeth engageable with the internal teeth on said extension; a shifter member mounted on said sleeve-like member and adapted for axial movement therewith; means for effectuating the rotation of said shaft and said driven member at substantially identical velocities before positive engagement therebetween is effected; said means comprising a plurality of identical mechanisms arranged in sets and disposed circumferentially in said driven member and about said shaft, each set including a spherical torque transmitting member positioned between two substantially T-shaped guiding and holding members and further positioned between said cam ramp on one side and the periphery of the shaft on the other side; and means actuated by the axial movement of said slidable sleeve for moving said guiding and holding members into and out of contact with said torque transmitting members in order to position said latter members into and out of frictional driving relation between said driven member and said shaft.

6. A synchronizer mechanism comprising: a shaft, a driven member rotatably mounted on said shaft; splines formed on said shaft; a sleeve-like member having internally formed splines and adapted for axial movement on said shaft; a shifter member mounted on said sleeve-like member and adapted for axial movement therewith; said driven member having a plurality of circumferentially spaced recesses in one face thereof and having said recesses fashioned with one wall thereof arcuately shaped; said arcuate portion being generated about an axis displaced radially from the axis of said driven member; torque transmitting members adapted for positioning into a frictional driving relation between said driven member and said shaft;

means for retaining said torque transmitting members confined within said recesses; and means actuated by the axial movement of said slidable sleeve for engaging and disengaging said torque transmitting members into and out of frictional driving relation between said driven member and said shaft, said means being slidably positioned and circumferentially disposed in said driven member.

7. A synchronizer mechanism comprising: a shaft, a driven member rotatably mounted on said shaft; splines formed on said shaft; a sleeve-like member having internally formed splines and adapted for axial movement on said shaft; a shifter member mounted on said sleeve-like member and adapted for axial movement therewith; said driven member having a plurality of circumferentially spaced recesses in one face thereof and having said recesses fashioned with one wall thereof arcuately shaped; said arcuate portion being generated about an axis displaced radially from the axis of said driven member; torque transmitting members adapted for positioning into a frictional driving relation between said driven member and said shaft; means for retaining said torque transmitting members confined within said recesses; and means actuated by the axial movement of said slidable sleeve for engaging and disengaging said torque transmitting members into and out of frictional driving relation between said driven member and said shaft, said means including a plurality of members slidably positioned within longitudinally extending members in turn adapted for slidable movement in circumferentially spaced and axially disposed apertures in said driven member, an annular ring having circumferentially disposed recesses therein adapted to receive in pressed fit relationship one end of each of said longitudinally apertured members, and a plurality of resilient members positioned circumferentially disposed recesses in said driven member and positioned so as to abut one face of said annular ring.

FRANK W. AVILA.

REFERENCES CITED

The following references are of record in the file of this patent:

UNITED STATES PATENTS

| Number | Name | Date |
|---|---|---|
| 2,415,393 | Peterson | Feb. 4, 1947 |